United States Patent
Pfeffer et al.

(10) Patent No.: US 11,440,115 B2
(45) Date of Patent: Sep. 13, 2022

(54) ASSEMBLY ASSISTANCE

(71) Applicant: Delavan Inc., West Des Moines, IA (US)

(72) Inventors: Brett A. Pfeffer, Granger, IA (US); Robert W. Vierhout, Cumming, IA (US); Dustin Andrew Borror, Norwalk, IA (US); Troy Finton, Phoenix, AZ (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/217,826

(22) Filed: Mar. 30, 2021

(65) Prior Publication Data

US 2021/0299772 A1    Sep. 30, 2021

Related U.S. Application Data

(60) Provisional application No. 63/002,230, filed on Mar. 30, 2020.

(51) Int. Cl.
| | |
|---|---|
| *B22F 10/22* | (2021.01) |
| *B33Y 10/00* | (2015.01) |
| *B23K 1/00* | (2006.01) |
| *B21D 39/04* | (2006.01) |
| *B33Y 80/00* | (2015.01) |

(52) U.S. Cl.
CPC .......... *B23K 1/0008* (2013.01); *B21D 39/046* (2013.01); *B22F 10/22* (2021.01); *B33Y 10/00* (2014.12); *B33Y 80/00* (2014.12)

(58) Field of Classification Search
CPC ..... B23K 1/0008; B22F 10/22; B21D 39/046; B33Y 10/00; B33Y 80/00
See application file for complete search history.

(56) References Cited

U.S. PATENT DOCUMENTS

| | | | |
|---|---|---|---|
| 5,023,043 A * | 6/1991 | Kotzlowski | F28D 7/12 376/150 |
| 9,914,172 B2 | 3/2018 | Roberts et al. | |
| 9,969,000 B2 | 5/2018 | Witney et al. | |
| 10,006,293 B1 | 6/2018 | Jones | |
| 10,190,502 B2 * | 1/2019 | Ryon | B23K 1/0018 |
| 10,422,161 B2 | 9/2019 | Connan | |
| 10,858,997 B2 * | 12/2020 | Ryon | F02C 7/22 |
| 2015/0037162 A1 | 2/2015 | James | |
| 2017/0368646 A1 * | 12/2017 | Ryon | B23K 1/18 |
| 2019/0153951 A1 * | 5/2019 | Ryon | B23K 1/0018 |
| 2019/0284866 A1 | 9/2019 | Marinack, Jr. et al. | |

FOREIGN PATENT DOCUMENTS

DE    202017102097 U1    5/2017

OTHER PUBLICATIONS

Extended European search report issued in corresponding EP application No. 21165351.4, dated Aug. 17, 2021.

\* cited by examiner

*Primary Examiner* — Lawrence Averick

(74) *Attorney, Agent, or Firm* — Locke Lord LLP; Joshua L. Jones; Gabrielle L. Gelozin

(57) ABSTRACT

A method including depositing a first material on a first member by an additive manufacturing process in a pattern intended to aid in an assembly of the first member and at least a second member and inserting the first member at least partially into the second member, with the first material being guide for insertion.

7 Claims, 5 Drawing Sheets

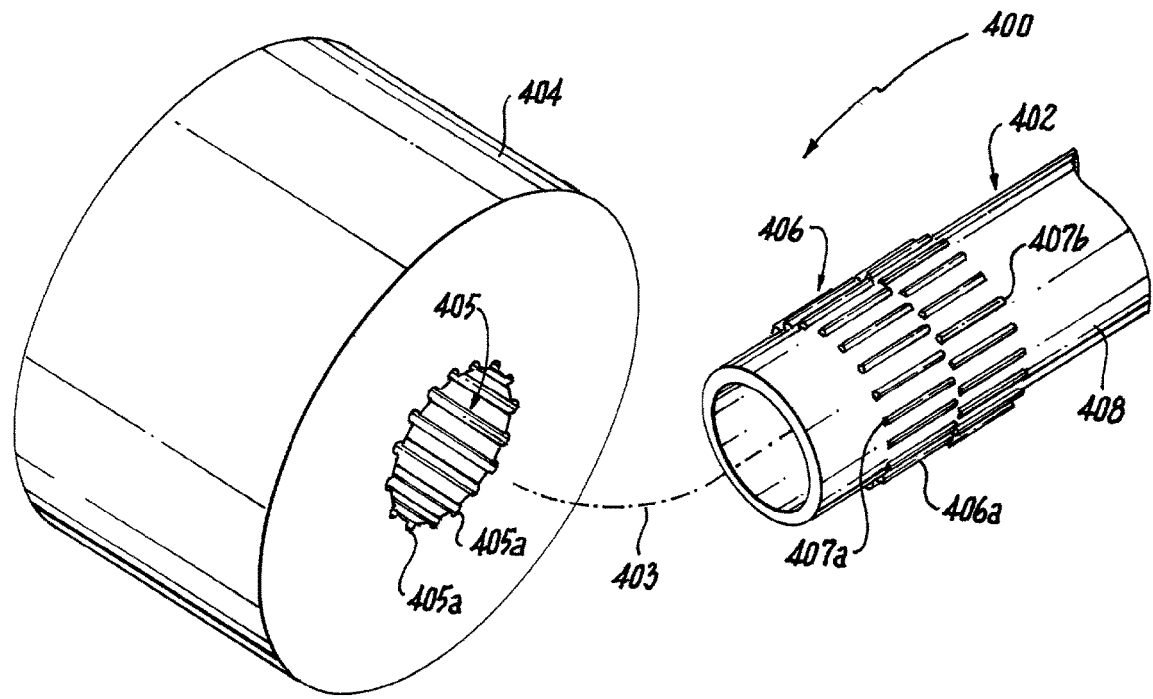
Fig. 4
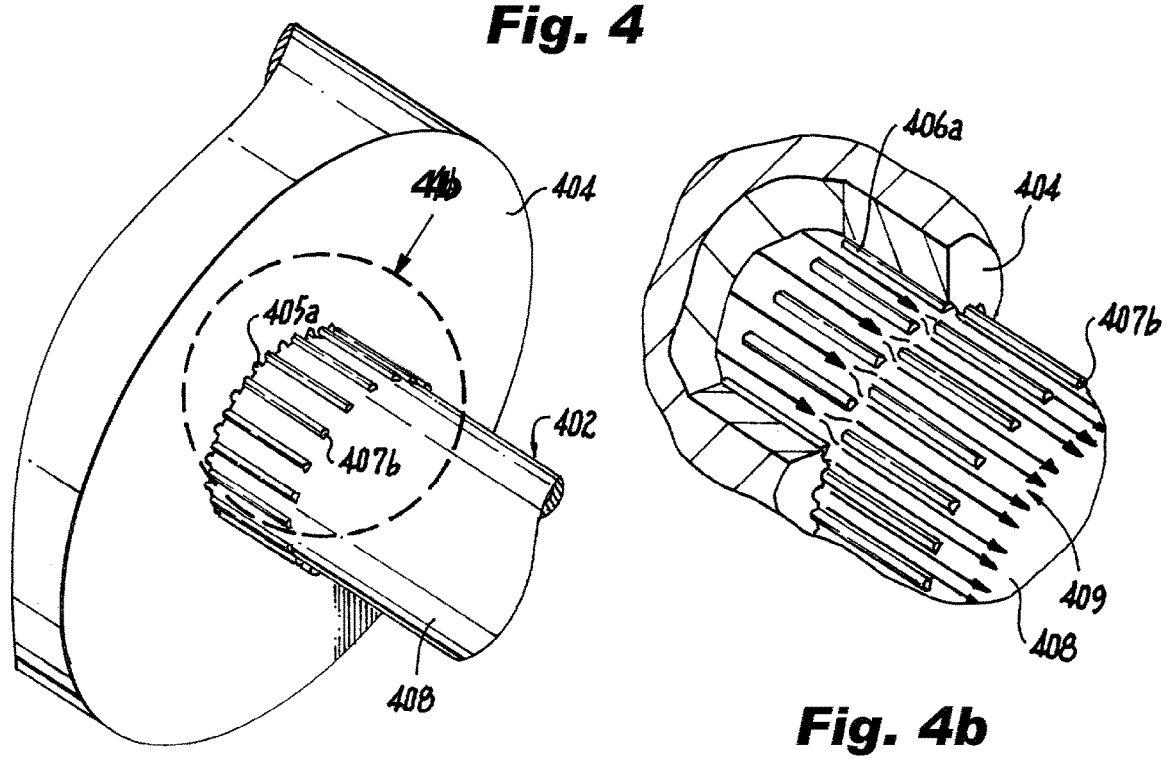
Fig. 4a
Fig. 4b

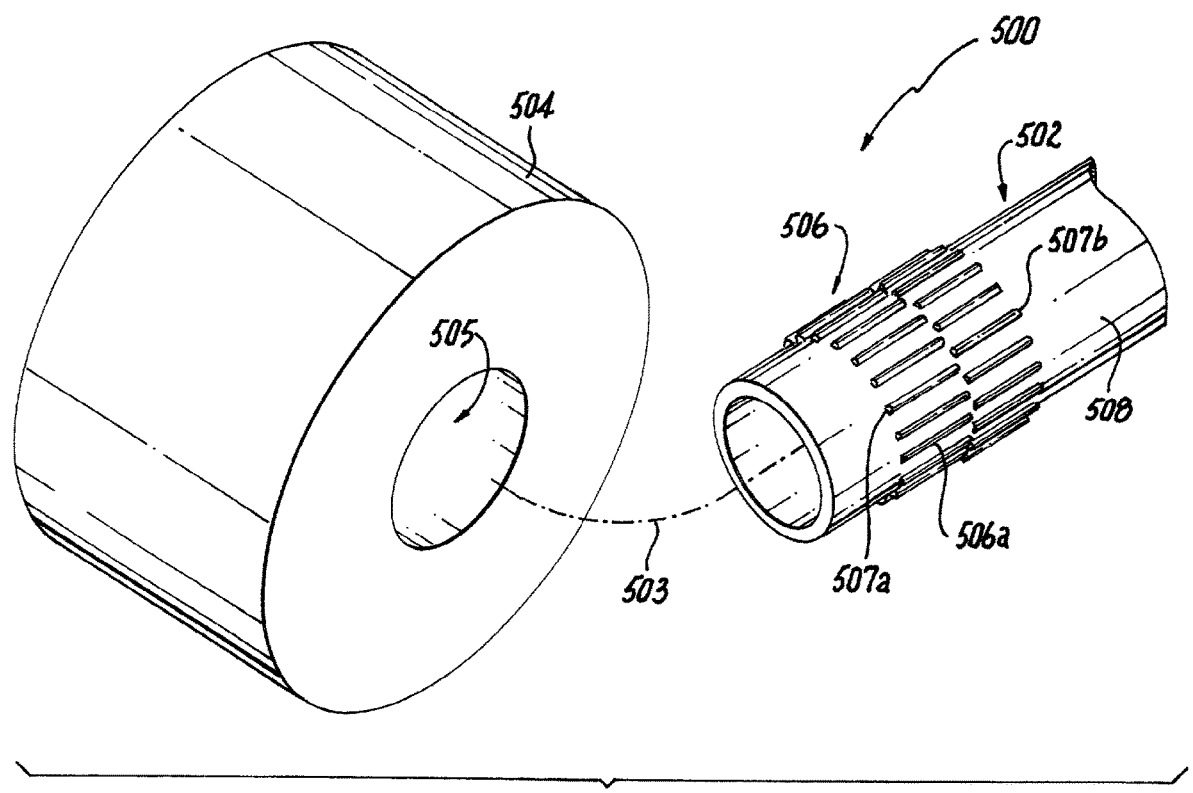
Fig. 5
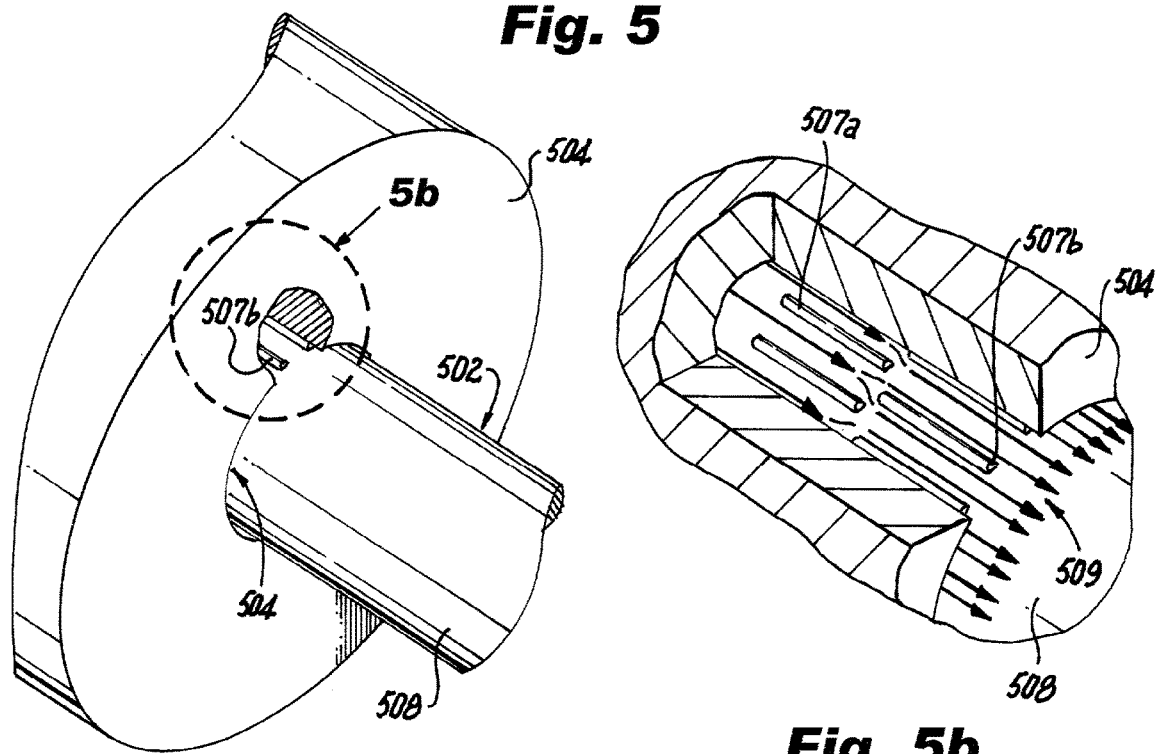
Fig. 5a  Fig. 5b

ASSEMBLY ASSISTANCE

CROSS-REFERENCE TO RELATED APPLICATIONS

This application claims priority to and the benefit of U.S. Provisional Application No. 63/002,230, filed Mar. 30, 2020, the entire contents of which are herein incorporated by reference in their entirety.

BACKGROUND

Technological Field

The present disclosure relates to manufacturing aides, and more particularly to manufacturing aides using an additive manufacturing process.

Description of Related Art

A variety of devices and methods are known for mistake proofing and aiding assembly. Traditional manufacturing aides use secondary equipment/processes to assist in the manufacturing process (i.e. the use of fixtures, ball tacking, additional machining of features, braze stop-off application, etc.). However, when many of these methods are employed secondary processing is required during assembly/manufacturing. These additional steps require more time and effort, and they can introduce unnecessary errors into their assemblies.

Accordingly, there is still a need in the art for assembly methods and arrangements having improved adaptability. There also is a need in the art for such assemblies and components to be economically viable. The present disclosure addresses these needs.

SUMMARY OF THE INVENTION

A method of assembling two tubular members includes depositing a first material on a first member by an additive manufacturing process in a pattern intended to aid in an assembly of the first member and at least a second member and inserting the first member at least partially into the second member, with the first material a guide for insertion. The depositing the first material on the first member by an additive manufacturing process can be done by directed energy deposition.

The first member can include a second material, wherein the second material is different that the first material. Depositing the first material can include deforming a microstructure of an outer surface of the first member by the deposition of the first material on the outer surface of the first member. The deformation does not include melting the outer surface of the first member, the deformation of the outer surface of the first member is less than 0.020 inches deep. The first material can also be removed from the first member.

A braze material can also be deposited on the first member. The braze material can be guided by the first the material by capillary action.

The assembly can include a first member configured to be at least partially inserted into a second member, and an assembly aid additively deposited on an outer surface of the first member configured to allow beginning insertion of the first member into the second member or prevent further insertion past a desired penetration distance of the first member into the second member. A braze material can be placed on the outer surface of the first member. A portion of the braze material can be in contact with the assembly aid.

A second member including an orifice therein can be configured to at least partially receive the first member. The assembly aid is at least partially inserted into a secondary orifice of the second member configured to receive the assembly aid. The orifice and the assembly aid can provide an interference fit or act as a keyway. The assembly aid can include multiple strips elongated in along a primary axis of the first member, wherein the strips are circumferentially spaced about the outer surface of the first member. The multiple strips can includes a first row of strips and a second row of strips, wherein the second row of strips is offset from the first row of strips along the primary axis of the first member. The first row of bands can be offset circumferentially from the second row bands. The assembly aid can include an indicia denoting an insertion direction or an origin of the first member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike;

FIG. 4-4b are a perspective view of an assembly according to an alternate embodiment of the disclosure showing a keyway fit using knurls;

FIG. 5-5b are a perspective view of an assembly according to an alternate embodiment of the disclosure showing an interference fit using knurls;

DETAILED DESCRIPTION

Figure 1:
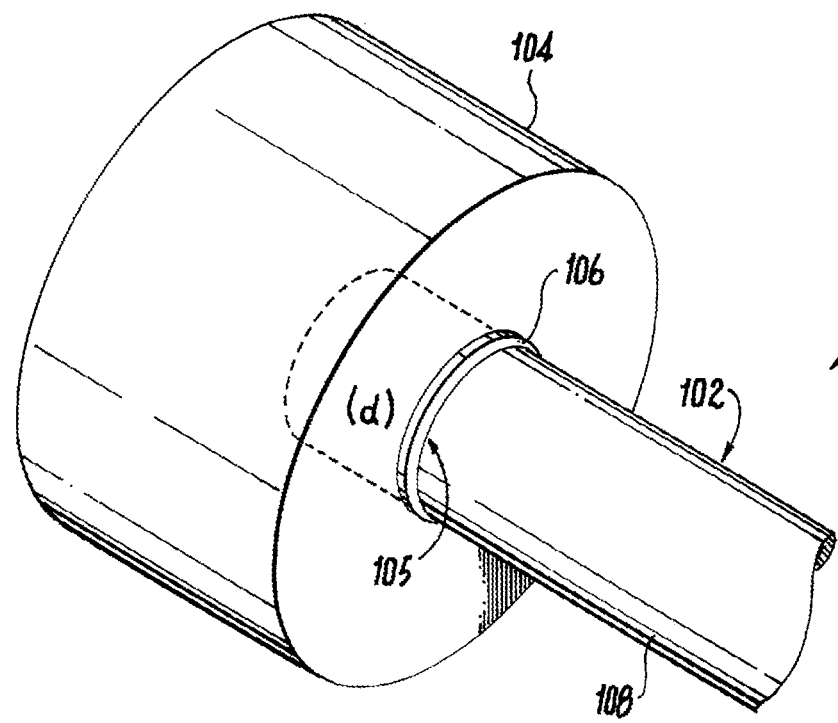
FIG. 1 is a perspective view of an assembly according to an embodiment of the disclosure.

Reference will now be made to the drawings wherein like reference numerals identify similar structural features or aspects of the subject invention. For purposes of explanation and illustration, and not limitation, a partial view of an exemplary embodiment of an assembly in accordance with the invention is shown in FIG. 1 and is designated generally by reference character 100. Other embodiments of the assembly in accordance with the invention, or aspects thereof, are provided in FIGS. 2-6b, as will be described. The methods and systems of the invention can be used to simplify assembly procedures and decrease assembly times.

FIG. 1 shows an assembly 100 including a first member 102 configured to be at least partially inserted into a second member 104 and an assembly aid 106 which is additively deposited on an outer surface 108 of the first member 102. The assembly aid 106 is conceived to serve multiple purposes. The assembly aid 106 is configured to allow the insertion of the first member 102 into the orifice 105 of the second member 104 up to a certain point and to prevent further insertion of the first member 102 past a desired penetration distance (d) to the second member 104.

Figure 2:
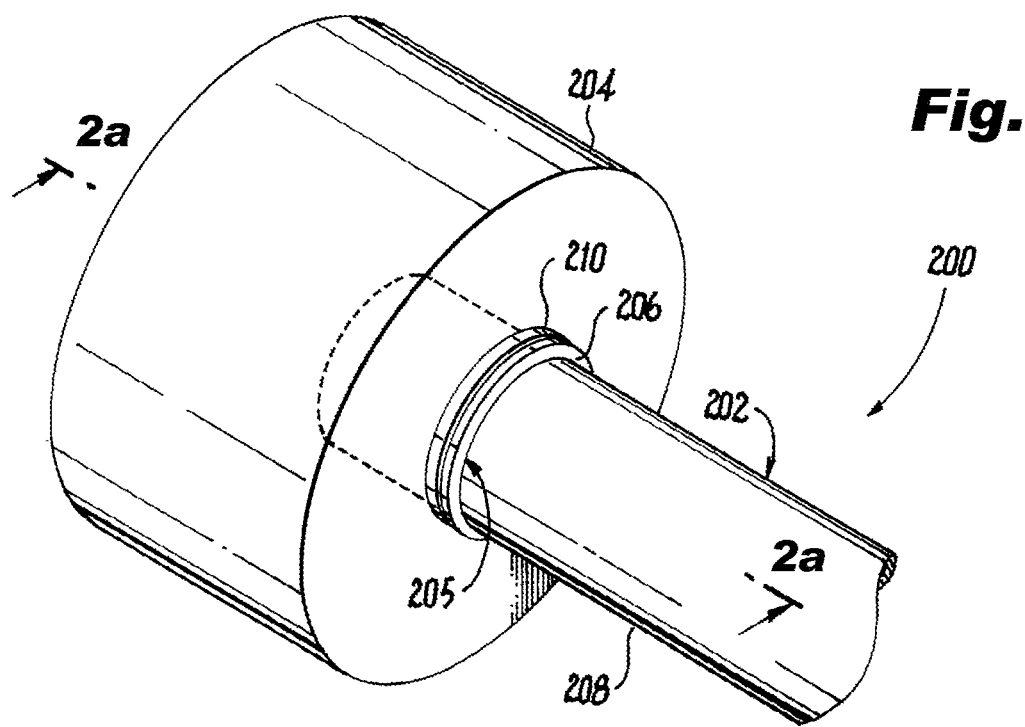
FIG. 2 is a perspective view of an assembly according to an alternate embodiment of the disclosure.
Figure 2A:
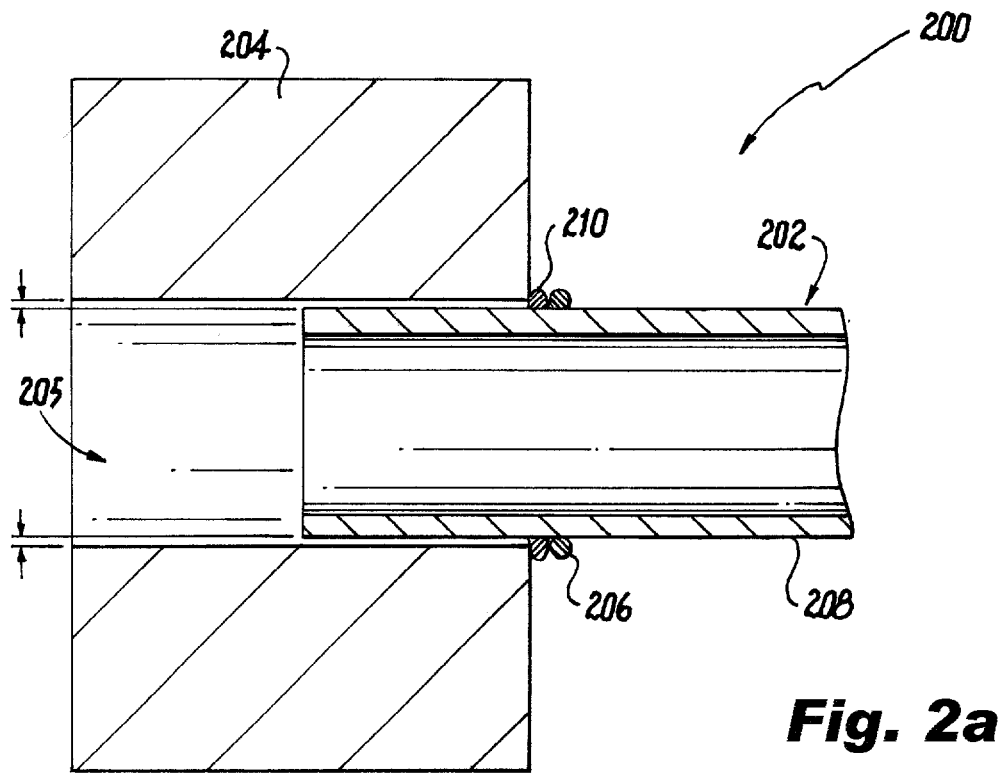
FIG. 2a is a side view of the assembly of FIG. 2, showing a cross section of the embodiment.

FIG. 2 shows an alternate embodiment of the assembly 200, herein the first member 202 which can be inserted into orifice 205 includes a braze material 210 in the shape of a ring, however other shapes, such as bands or dots are possible, on the outer surface 208 of the first member 202. FIG. 2a shows a cross-sectional view of the assembly 200 of FIG. 2. The assembly aid 206 is shown backing the braze material 210, while the first member 202 is partially fitted inside the second member 204 including a gap (w) between an outer surface of the first member 202 and an inner surface of the second member 204. The assembly aid 206 can be added on in the shape of a ring, or dots by additive manufacturing in order to hold the braze material 210 in place during assembly to ensure the braze material 210 remains in contact with the surface of 204. A boundary between the assembly aid 206 and the first member 202 includes a deformation of the outer surface of the first member 202. The deformation is only as deep as 0.020 of an inch. This depth is due to the nature of the deposition of the assembly aid 206, instead of welding which can result in much deeper marks which can melt or deform the first member.

Figure 3:
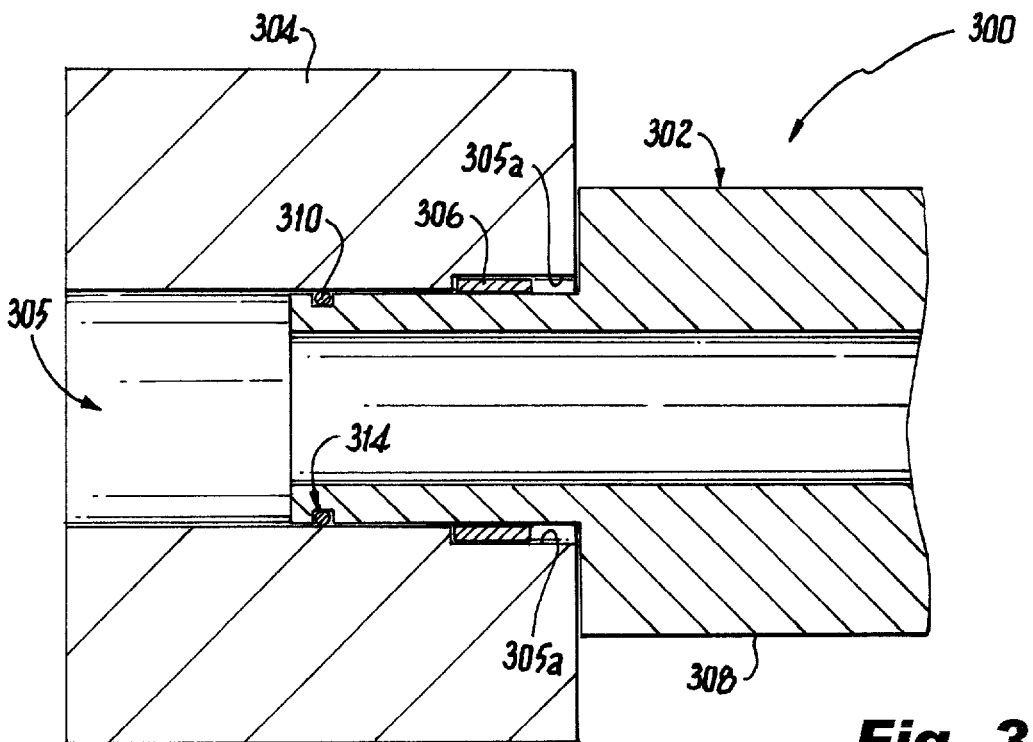
FIG. 3 is a side view of an assembly according to an alternate embodiment of the disclosure showing a cross section of the embodiment.

FIG. 3 shows an alternate embodiment of the assembly 300. Here, the braze material 310 is in a groove 314. Materials used for the assembly aid 306 includes a rougher surface finish and more porous material than the surface finish of the outer surface 308 of the first member 302. The rougher surface finish of the assembly aid 306, along with the porosity of the assembly aid encourages the braze material to flow towards the assembly aid 306 by capillary action when the first member 302 is inserted into orifice 305. The assembly aid 306 also serves to arrest the flow of braze material thereby preventing braze material flow into unwanted areas. The assembly aid 306 is at least partially inserted into a secondary orifice 305a of the second member 304 which is shaped to receive a complementary shape.

FIG. 4 shows an alternate embodiment of the assembly 400, wherein the assembly aid 406 includes multiple strips 406a elongated along the longitudinal axis 403 of the first member 402, wherein the strips 406a act as a keyway into the second member of the orifice 405. The strips 406a are raised material from the parent material surface. The strips 406a are arranged circumferentially about the outer surface 408 of the first member 402. The strips 406a include a first row 407a of strips and a second row of strips 407b disposed behind the first row of strips 407a along first member. The first row of bands 407a is offset circumferentially from the second row bands 407b in order to allow the first row of bands 407a to enter the secondary orifice 405a. However, the offset second row of bands 407b do not allow the first member 402 to enter further into the orifice 405. Further, the offset of 407b to 407a allows a flow 409 of a fluid directed from within the second member 404.

FIG. 5 shows an alternate embodiment of the assembly 500, wherein the assembly aid 506 includes multiple strips 506a elongated along the longitudinal axis 503 of the first member 502, wherein the strips 506a act to center the first member 502 within the second member 504 into the second member of the orifice 505. The strips 506a are arranged circumferentially about the outer surface 508 of the first member 502. The strips 506a include a first row 507a of strips and a second row of strips 507b disposed behind the first row of strips 507a along first member. The first row of bands 507a is offset circumferentially from the second row bands 507b in order to allow the first row of bands 507a to enter the secondary orifice 505a. The offset of 507b to 507a encourages the flow of braze material if used during assembly. The strips 506a are raised material from a parent material surface.

The raised material creates an interference fit with orifice 505 during insertion and allow the first member 502 to be fully inserted into the orifice 505. Further, the offset of 507b to 507a allows a flow 509 of a fluid directed from within the second member 504 or a braze material located therein to flow between the strips 506a and out of the orifice 505. The offset of 507b to 507a allows a flow 509 of a fluid directed from within the second member 504.

Figure 6A:
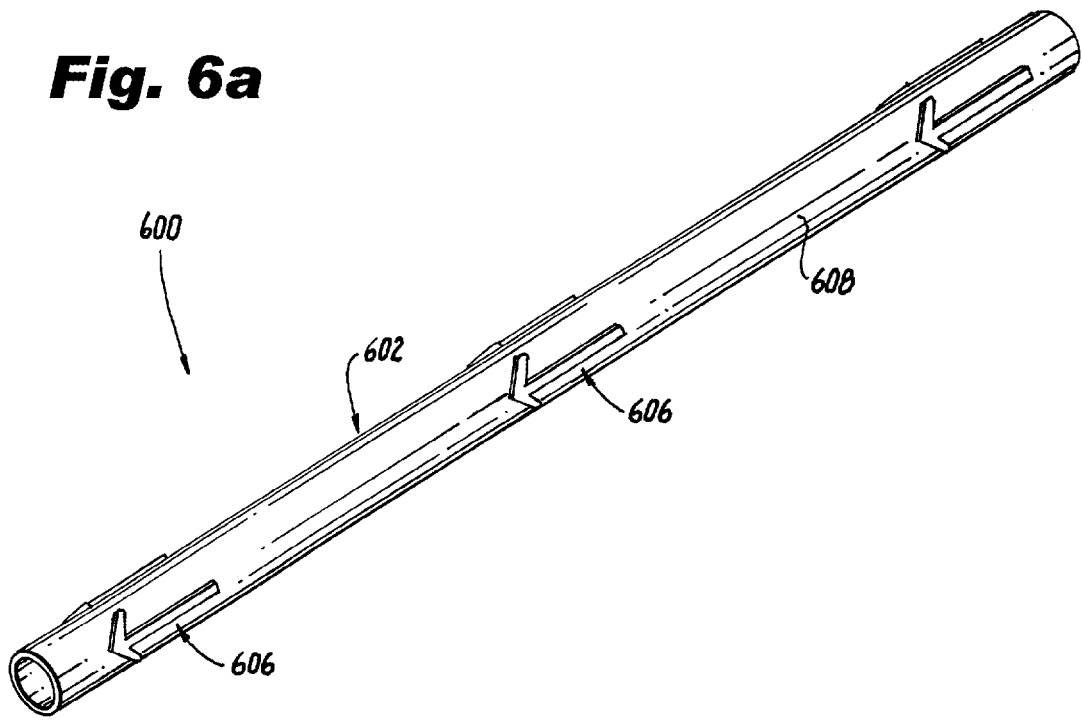
FIG. 6a is a perspective view of an assembly according to an alternate embodiment of the disclosure showing an insertion direction indicia.
Figure 6B:
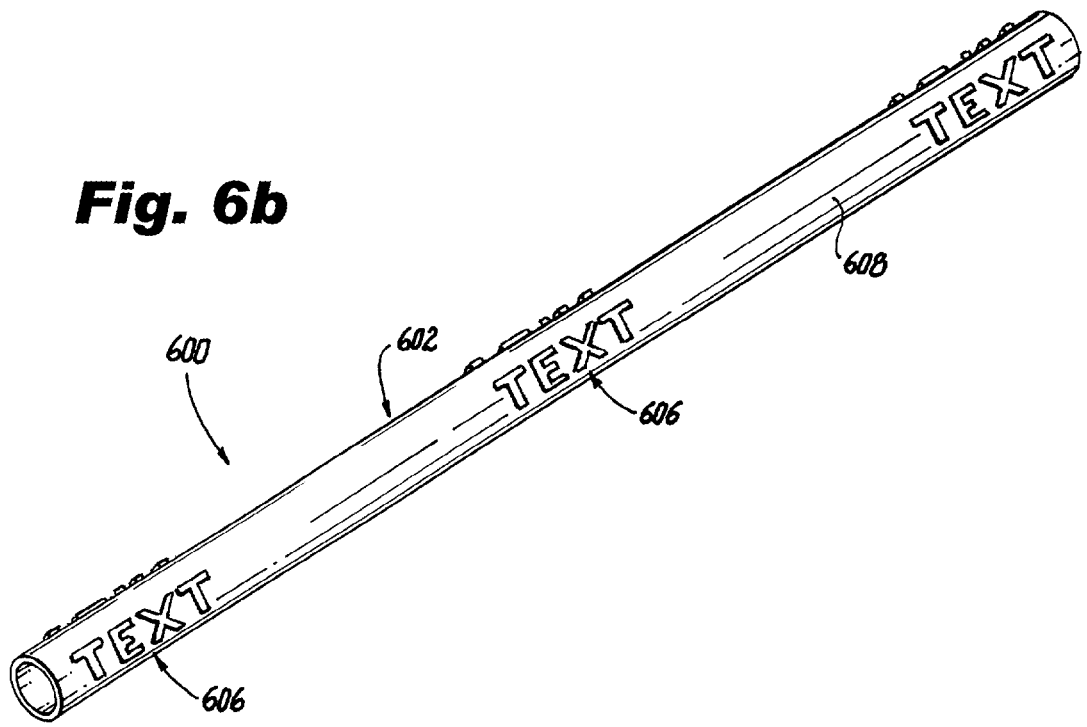
FIG. 6b is a perspective view of an assembly according to an alternate embodiment of the disclosure showing an origin of the item indicia.

FIGS. 6a and 6b show an embodiment of the assembly 600 wherein the assembly aid 606 includes an indicia denoting an insertion direction, or a desired flow direction of a liquid within the member as shown in FIG. 6a or as an origin of the first member 602 as shown in FIG. 6b. The part identification in FIG. 6b demonstrates raised material that can then be seen by non-destructive inspection techniques (i.e. x-ray). The raised material in FIG. 6b can also be functional and remain on the part after assembly. The assembly aid 606 can also be removed since the deposition of the assembly aid 606 in the first place on the outer surface 608 of the first member 602 deforms a microstructure of the outer surface 608.

The methods and systems of the present disclosure, as described above and shown in the drawings, provide for assemblies with superior properties including reduced size, weight, complexity, and/or cost. The methods presented above also reduce waste, save time and improve quality of the various fits. While the assemblies and methods of the subject disclosure have been shown and described with reference to embodiments, those skilled in the art will readily appreciate that changes and/or modifications may be made thereto without departing from the spirit and score of the subject disclosure.

What is claimed is:

1. A method comprising the steps of:
   depositing a first material on a first member by an additive manufacturing process in a pattern intended to aid in an assembly of the first member and at least a second member;
   inserting the first member at least partially into the second member, with the first material configured to act a guide for insertion;
   deforming a portion of an outer surface of the first member by the deposition of the first material on the outer surface of the first member; and
   removing the first material from the first member.

2. The method of claim 1, wherein depositing the first material on the first member by an additive manufacturing process is done by directed energy deposition.

3. The method of claim 1, wherein deforming does not include melting the outer surface of the first member.

4. The method of claim 1, where a deformation of the outer surface of the first member is less than 0.020 inches deep.

5. The method of claim 1, further comprising brazing a third material on the first member.

6. The method of claim 5, further comprising guiding the brazed material by the first material by capillary action.

7. The method of claim 1, wherein the first member comprises a second material different than the first material.

\* \* \* \* \*